United States Patent
Nihira et al.

(10) Patent No.: US 7,015,892 B1
(45) Date of Patent: Mar. 21, 2006

(54) MAGNETOPHORETIC DISPLAY PANEL

(75) Inventors: Yoshito Nihira, Tokyo (JP); Takahiro Itou, Tokyo (JP)

(73) Assignee: Takara Co., Ltd., Tokyo (JP)

( * ) Notice: Subject to any disclaimer, the term of this patent is extended or adjusted under 35 U.S.C. 154(b) by 745 days.

(21) Appl. No.: 09/658,391

(22) Filed: Sep. 8, 2000

(30) Foreign Application Priority Data

Sep. 10, 1999 (JP) ................................. 11-256869

(51) Int. Cl.
G09G 3/34 (2006.01)
(52) U.S. Cl. .................... 345/107; 345/179; 434/409
(58) Field of Classification Search ................ 345/107, 345/173–179; 434/409
See application file for complete search history.

(56) References Cited

U.S. PATENT DOCUMENTS

| 3,406,363 A | 10/1968 | Tate |
| 3,982,334 A | 9/1976 | Tate |
| 4,143,472 A | 3/1979 | Murata et al. |
| 4,232,084 A | 11/1980 | Tate |
| 4,451,985 A * | 6/1984 | Pullman ...................... 434/85 |
| 4,536,428 A * | 8/1985 | Murata et al. .............. 428/117 |
| 5,057,363 A | 10/1991 | Nakanishi |
| 5,151,032 A | 9/1992 | Igawa |
| 5,411,398 A | 5/1995 | Nakanishi et al. |
| 5,820,385 A | 10/1998 | Ohashi et al. |
| 6,103,347 A * | 8/2000 | Nojima et al. .............. 434/409 |
| 6,196,848 B1 * | 3/2001 | Yamazaki ................... 434/409 |
| 6,473,072 B1 * | 10/2002 | Comiskey et al. .......... 345/173 |

FOREIGN PATENT DOCUMENTS

| EP | 994455 | 4/2000 |
| JP | 5635356 | 8/1981 |
| JP | 5746439 | 10/1982 |
| JP | 5947676 | 11/1984 |
| JP | 87532 | 1/1996 |
| JP | 8183291 | 7/1996 |
| JP | 11105489 | 4/1999 |
| JP | 11119705 | 4/1999 |
| WO | 9913955 | 3/1999 |

* cited by examiner

Primary Examiner—Amr A. Awad
Assistant Examiner—Kimnhung Nguyen

(57) ABSTRACT

A magnetophoretic display panel capable of displaying clear and distinct indicia and erasing the indicia neatly. The display panel includes a multi-cell structure having a thickness of 0.8 to 1.5 mm and formed with a number of cells which contain therein colored liquids and colored magnetic particles. A magnetic pen exhibits an effective magnetic flux density of 100 to 500 Gauss at a bottom of a magnetic panel when positioned on a surface of the magnetic panel. An erasure magnet exhibits an effective magnetic flux density of 300 to 1500 Gauss at the surface of the magnetic panel when positioned on the bottom of the magnetic panel.

20 Claims, 3 Drawing Sheets

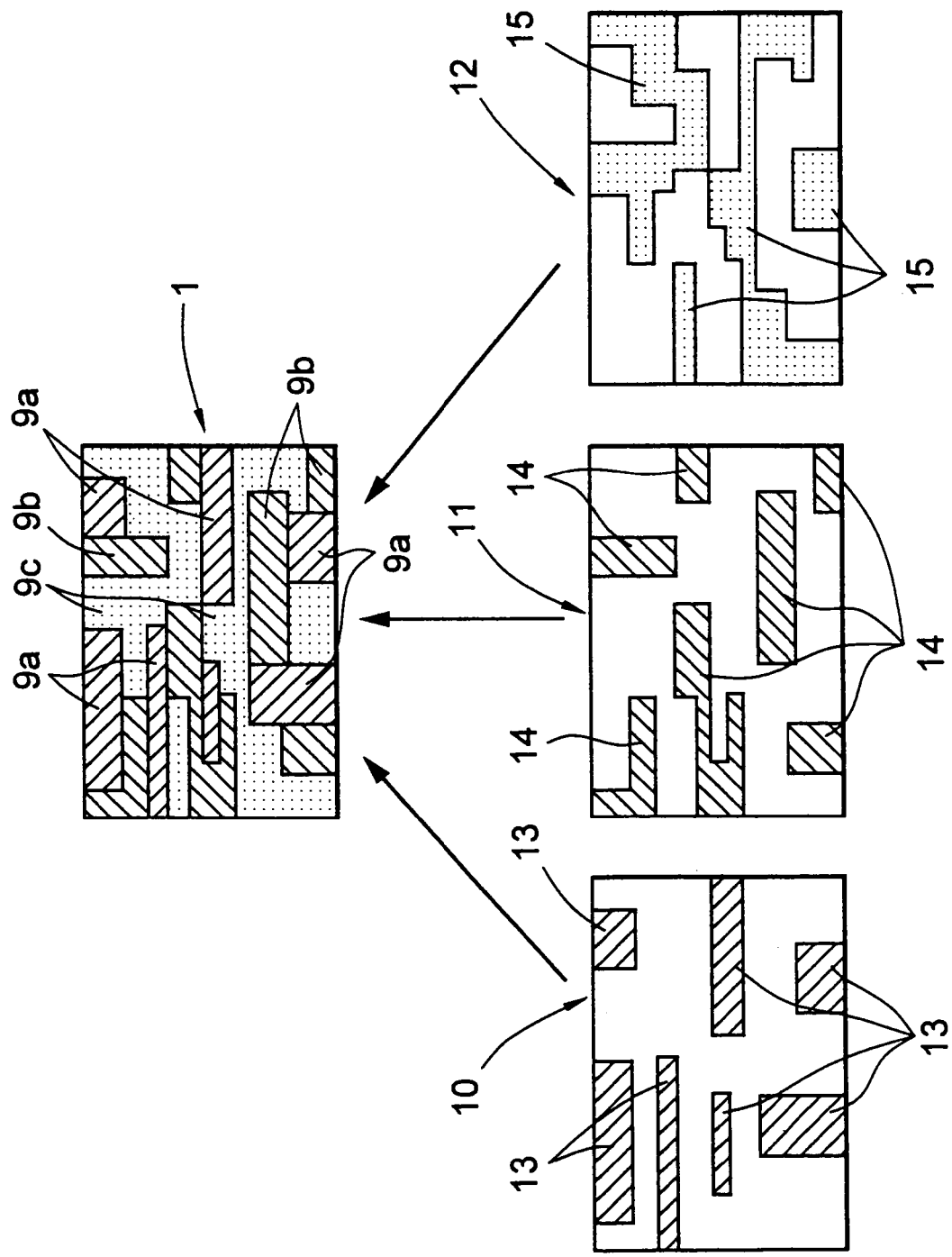

MAGNETOPHORETIC DISPLAY PANEL

BACKGROUND OF THE INVENTION

The present invention relates to a magnetophoretic display panel in which magnetic particles encapsulated in the panel migrate due to magnetophoresis under the action of a magnetic field, to thereby effect display and erasure.

There has heretofore been known a method of display by using a magnetic panel having a multi-cell structure formed between two substrates and in which a liquid dispersion comprising magnetic particles, a dispersion medium, a coloring agent and a thickening agent is encapsulated in the cells between the two substrates, wherein the magnetic particles migrate due to magnetophoresis from the bottom of the magnetic panel as they are attracted toward the surface of the magnetic panel by the action of a magnetic field produced by a magnetic pen for recording, to thereby produce the display relying upon a difference in color between the dispersion medium and the magnetic particles, as disclosed in, for example, Japanese Patent Publications Nos. 47676/1984 and 46439/1982, Japanese Utility Model Publication No. 35356/1981, and Japanese Patent Laid-Open Publication No. 183291/1996.

Various properties of the magnetic particles encapsulated in the magnetic panel have been disclosed in Japanese Patent Publication No. 7532/1996.

The display and erasure on the magnetic panel are determined by:
(1) a thickness of the panel;
(2) an effective magnetic flux density when the recording or erasure magnet is slid on the upper surface or the lower surface of the panel;
(3) magnetization of the magnetic particles when the so-called low magnetic field is acted upon corresponding to the effective magnetic flux density of the magnet stated in (2) above; and
(4) a viscosity of the liquid which is a dispersion medium.

Unfortunately, the problem cannot be solved by only the individual factors described in the above publications, such as saturation magnetization of the magnetic particles, thickness of the panel, flux density of the magnet, etc.

SUMMARY OF THE INVENTION

It is therefore an object of the present invention is to provide a magnetophoretic display panel capable of displaying clear and distinct indicia and erasing the indicia neatly.

It is another object of the present invention is to provide a magnetophoretic display panel having a plurality regions of various color tones on which indicia are displayed.

In accordance with one aspect of the present invention, a magnetophoretic display panel is provided. The magnetophoretic display panel includes: a magnetic panel including a pair of substrates at least one of which is transparent and a multi-cell structure which is sealedly arranged between the substrates and formed with an interior space of a thickness of 0.8 to 1.5 mm, the multi-cell structure including a number of cells each of which contains therein a colored liquid and colored magnetic particles having a color tone different from that of the colored liquid; a magnetic recording member provided on an end thereof with a magnet, which member is adapted to be slidably moved on a surface of the magnetic panel to form a display on the surface of the magnetic panel due to magnetophoresis of the magnetic particles in each of the cells; and an magnetic erasure member arranged at a bottom of the magnetic panel so as to be moved along the bottom of the magnetic panel, to thereby erase the display on the surface of the magnetic panel due to magnetophoresis of the magnetic particles in each of the cells. The magnetic recording member exhibits an effective magnetic flux density of 100 to 500 Gauss at the bottom of the magnetic panel when the magnetic recording member is positioned on the surface of the magnetic panel. The magnetic erasure member exhibits an effective magnetic flux density of 300 to 1500 Gauss at the surface of the magnetic panel when the magnetic erasure member is positioned on the bottom of the magnetic panel.

In a preferred embodiment of the present invention, a number of the cells of the magnetic panel are classified into a plurality of regions by patterning, and the cells of each region contain the respective colored liquid and the respective colored magnetic particles having a color tone different from that of the respective colored liquid.

In a preferred embodiment of the present invention, the colored magnetic particles exhibit a magnetization of 8.0 emu/g or more when a magnetic field of 200 Oe is applied to the colored magnetic particles and exhibit a magnetization of 20.0 emu/g or more when a magnetic field of 500 Oe is applied to the colored magnetic particles, and each of the cells of the magnetic panel contains 80 to 90 wt % of the colored liquid and 10 to 20 wt % of the colored magnetic particles having a color tone different from that of the colored liquid.

In a preferred embodiment of the present invention, each of the colored liquids comprises a liquid mixture including isoparaffin, titanium oxide, silicon oxide, alumina and a coloring pigment, and the liquid mixture has a viscosity of 200 to 800 cP at 25° C.

In accordance with another aspect of the present invention, a magnetophoretic display device is provided. The magnetophoretic display device includes: a transparent front substrate; a bottom substrate; a multi-cell structure sealedly interposed between the front and bottom substrates, the multi-cell structure having a thickness of 0.8 to 1.5 mm and being formed with a number of cells; dispersions each including a colored liquid and magnetic particles which have a color tone different from that of the colored liquid and which are dispersed in the colored liquid, the dispersions being encapsulated in the cells of the multi-cell structure; a magnetic recording member provided at an end thereof with a magnet adaptable to be brought into contact with a surface of the front substrate to form a display on the front substrate due to magnetophoresis of the magnetic particles in each of the cells; and a magnetic erasure member arranged on an outer surface of the bottom substrate so as to be moved along the outer surface of the bottom substrate, to thereby erase the display on the front substrate due to magnetophoresis of the magnetic particles in each of the cells. The magnetic recording member exhibits an effective magnetic flux density of 100 to 500 Gauss in the vicinity of the bottom substrate when the magnetic recording member is positioned on the surface of the front substrate. The magnetic erasure member exhibits an effective magnetic flux density of 300 to 1500 Gauss at the surface of the front substrate when the magnetic erasure member is positioned on the outer surface of the bottom substrate.

In a preferred embodiment of the present invention, a number of the cells are classified into a plurality of regions by patterning in such a manner that the cells in each region contain the respective dispersion including the colored liquid which has the color tone different from that of the colored liquid which is included in the liquid dispersion contained in the cells of the adjacent region.

In a preferred embodiment of the present invention, the colored magnetic particles exhibit a magnetization of 8.0 emu/g or more when a magnetic field of 200 Oe is applied to the colored magnetic particles and exhibit a magnetization of 20.0 emu/g or more when a magnetic field of 500 Oe is applied to the colored magnetic particles.

In a preferred embodiment of the present invention, each of the dispersions contains 80 to 90 wt % of the respective colored liquid and 10 to 20 wt % of the respective colored magnetic particles having a color tone different from that of the respective colored liquid.

In a preferred embodiment of the present invention, each of the colored liquids includes isoparaffin, titanium oxide, silicon oxide, alumina and a coloring pigment.

In a preferred embodiment of the present invention, each of the colored liquids has a viscosity of 200 to 800 cP at 25° C.

In the magnetophoretic display panel or magnetophoretic display device of the present invention, limitation is imposed on the thickness of the panel and limitation is further imposed on the effective magnetic flux densities of the recording and erasure magnets in a state inclusive of the panel thickness. Further, limitation is imposed on the viscosities of the colored liquids which are contained in the panel, and the range of magnetization of the colored magnetic particles is provided depending upon the magnetic field of the magnet to clearly and distinctly display indicia, such as characters, pictures and the like, as well as to erase the indicia neatly. Further, the arrangement of the colored liquids of different colors for each of the regions obtained by dividing the surface of the panel by patterning and the arrangement of the colored magnetic particles of a color different from that of the colored liquids, permit various color tones to be obtained on the surface of the panel.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 4 is a schematic view showing patterning a plurality of liquids having different colors that are encapsulated in the panel.

DETAILED DESCRIPTION OF THE PREFERRED EMBODIMENTS

Now, a magnetophoretic display panel or display device according to the present invention will be described with reference to the accompanying drawings.

Figure 1:
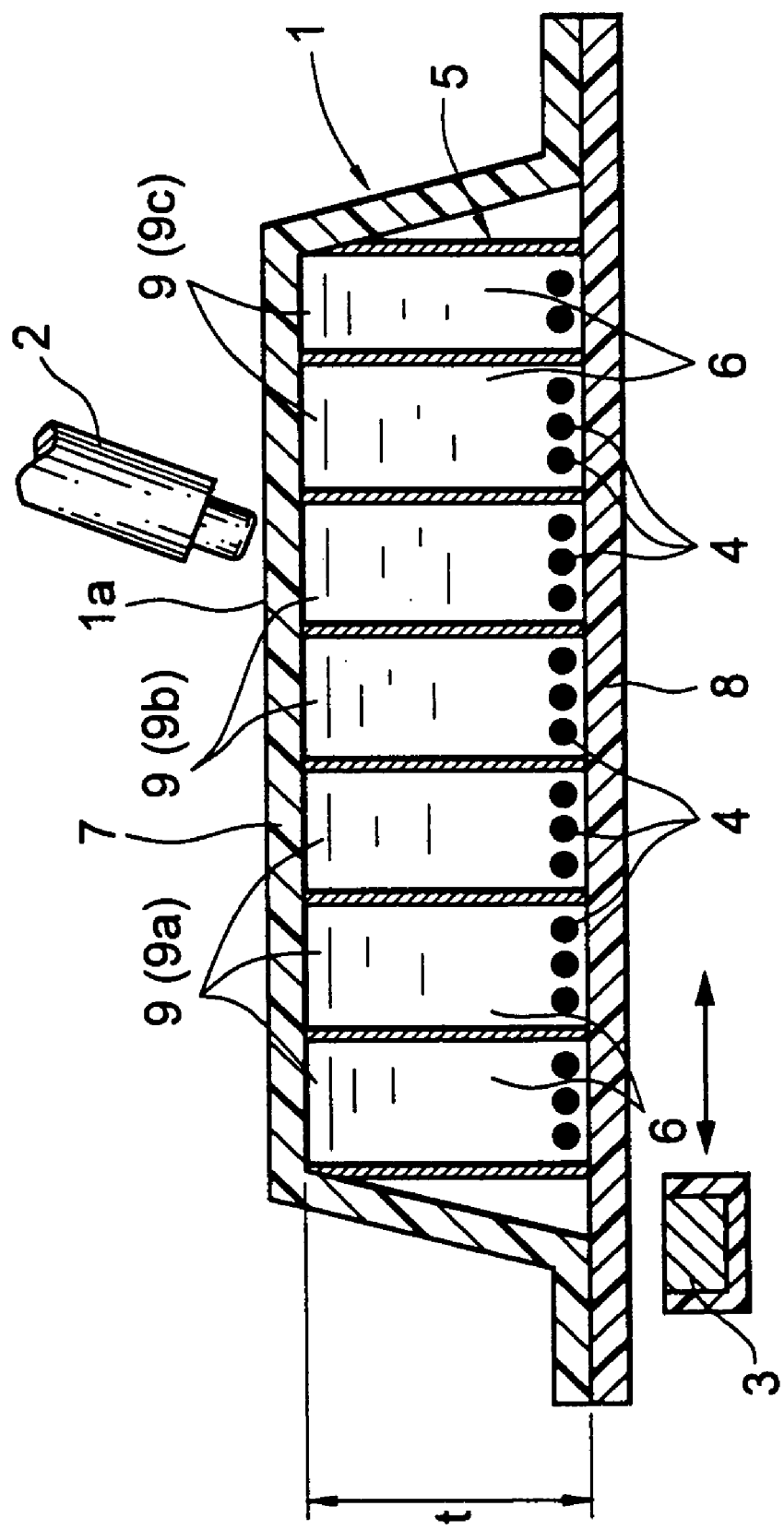
FIG. 1 is a sectional view illustrating a magnetophoretic display panel.

Referring first to FIG. 1, an embodiment of a magnetophoretic display panel according to the present invention is illustrated. A magnetophoretic display panel of the illustrated embodiment includes a magnetic panel 1, a magnetic recording member or magnetic pen 2 and a magnetic erasure member or erasure magnet 3. When the magnetic pen 2 is brought into contact with a surface 1a of the panel 1 or slid on the surface of the panel 1, a magnetic field acts on colored magnetic particles 4 contained in the panel 1, whereby the colored magnetic particles 4 migrate due to magnetophoresis to produce a predetermined display on the surface 1a of the panel 1. As for the erasure of the display thus produced in the same manner, the erasure magnet 3 is moved along a bottom of the panel 1 to erase the display on the surface 1a of the panel 1.

Figure 2:
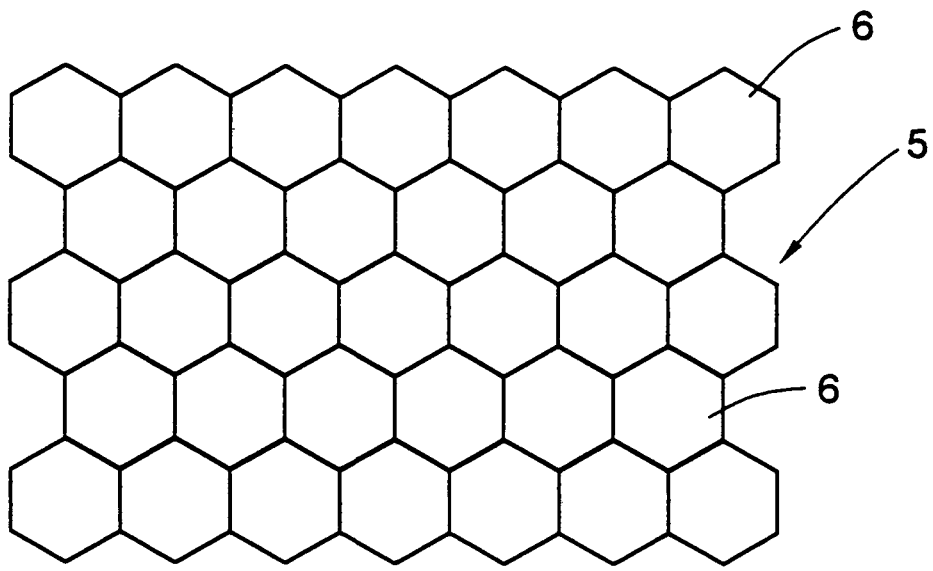
FIG. 2 is a plan view illustrating, on an enlarged scale, a multi-cell structure on a surface of the magnetophoretic display panel.

The magnetic panel 1 is sealedly constituted by a pair of substrates 7 and 8 on both open ends of a multi-cell structure 5 having a number of cells 6 formed therein, wherein at least one of the substrates 7 and 8 is transparent. It is most desired that each of the cells 6 of the multi-cell structure 5 be formed to have a hexagonal cylindrical shape with an orthohexagonal configuration as viewed in plan, as shown in FIG. 2. The multi-cell structure 5 can be represented by a honeycomb structure. Though there is no particular limitation, it is desired that a material of the above structure be made of paper coated with a resin or of special paper made from a pulp. The term "transparency or transparent" stands for that the color of the colored liquid 9 in the cell 6 can be seen through and, in short, stands for a state where the color of the colored liquid 9 can be seen through by a user despite the substrate is fogged, the substrate itself is colored or the substrate is embossed.

Referring to FIG. 1, each cell 6 contains the respective colored liquid 9 and colored magnetic particles 4 of a color tone different from that of the colored liquid 9. The magnetic pen 2 having a permanent magnet at an end thereof is brought into contact with or slid on the surface 1a of the magnetic panel 1, whereby the magnetic particles 4 in the cell 6 of the panel 1 migrate due to magnetophoresis to produce a display on the surface 1a of the panel 1. It is desired that each cell 6 of the multi-cell structure 5 have a hexagonal cylindrical shape having an orthohexagonal configuration in plan since such a shape enhances the resolution of displayed indicia, such as characters and pictures, and is further advantageous from the standpoint of strength.

As will be described later, the cells 6 are classified into three regions according to a predetermined patterning, and the cells 6 of each region are filled with a respective one of the liquids 9a, 9b and 9c of three colors different from the colors of the liquids of other regions or adjacent regions. Therefore, the surface 1a of the magnetic panel 1 is divided into the three regions distinguished by different colors.

In the magnetic panel 1, further, the multi-cell structure 5 sealed by the pair of substrates 7 and 8 is formed with an interior space having a thickness t of 0.8 to 1.5 mm therein. When the magnetic pen 2 is positioned on the surface 1a of the magnetic panel 1, the magnetic pen 2 exhibits an effective magnetic flux density of 100 to 500 Gauss at the bottom of the magnetic panel 1. When the erasure magnet 3 is positioned on the bottom of the magnetic panel 1, the erasure magnet 3 exhibits an effective magnetic flux density of 300 to 1500 Gauss at the surface 1a of the magnetic panel 1.

The thickness of the magnetic panel 1 is limited as described above because of the reason that when the thickness t is smaller than 0.8 mm, the colored magnetic particles 4 must be contained in large amounts in the liquid for adjusting the coloring degree of the colored liquid 9 in order to conceal the color tone of the magnetic particles 4 in the cells 6. As a result, the viscosity of the liquid becomes so high that the magnetic particles 4 fail to be smoothly magnetophoresed. Therefore, the magnetic pen 2 and the erasure magnet 3 must produce increased effective magnetic flux densities, driving up the cost of the material used for the magnets. In addition, resolution or distinctness of the indicia displayed on the surface 1a of the panel 1 is deteriorated.

When the magnetic panel 1 has a thickness t of 0.8 to 1.5 mm, it is desired that the magnetic pen 2 that is positioned on the surface 1a of the magnetic panel 1 exhibit an effective magnetic flux density of 100 to 500 Gauss at the bottom of the magnetic panel 1.

When the effective magnetic flux density of the magnetic pen 2 is smaller than 100 Gauss, the magnetophoretic action in the cells 6 is so weak that the display is not accomplished on the surface 1a of the panel 1. When the effective magnetic flux density of the magnetic pen 2 exceeds 500 Gauss, the magnetic field is so strong that the indicia formed on the surface 1a of the panel 1 by the magnetic particles 4 due to magnetophoresis lack resolution.

Further, when the erasure magnet 3 is positioned on the bottom of the magnetic panel 1, it is desired that the erasure magnet 3 exhibit an effective magnetic flux density of 300 to 1500 Gauss at the surface 1a of the magnetic panel 1.

When the effective magnetic flux density of the erasure magnet 3 is smaller than 300 Gauss, the action of magnetophoresis in the cells 6 is so weak that it becomes difficult to erase the displayed indicia on the surface 1a of the panel 1. When the effective magnetic flux density of the erasure magnet 3 exceeds 1500 Gauss, the magnetic field is so strong that the magnetic particles 4 that are magnetophoresed are vertically aggregated and remain near the surface 1a of the panel 1.

Due to limitation on the thickness of the panel 1 as described above, limitation is imposed on the effective magnetic flux densities of the magnetic pen 2 and of the erasure magnet 3, making it possible to clearly and distinctly display indicia, such as characters and pictures, on the surface 1a of the panel 1 and to erase them neatly.

The material of the magnetic panel 1 may be any known resin such as vinyl chloride, polyester, polyethylene or the like. It is, however, desired to use an olefin resin.

Further, any known material can be used as the magnetic pen 2 and as the erasure magnet 3. For example, there can be used a magnet comprised of ferrite particles (magnetoplumbite ferrite) or metal particles (Nd, Sm, Co, Fe, Ni, which may be used alone or an alloy thereof), or there can be used a magnet 3 molded by adding a rubber or a resin to the above material.

The magnetic panel 1 includes the multi-cell structure 5 which is sealed by the pair of substrates 7 and 8 to form the interior space, as described above, and each cell 6 contains the colored liquid 9 and colored magnetic particles 4 having a color tone different from that of the colored liquid 9.

As the colored liquid 9, there can be preferably used isoparaffin to which are added titanium oxide, silicon oxide, alumina and a coloring pigment. When it is desired to produce a display of four colors, the pigment should be selected, in the case of, for example, red color, from quinacridone, anthraquinone dye, diazo dye and the like. In the case of yellow color, the pigment should be selected from benzidine yellow, quinoline yellow, monoazo dye and the like. In the case of blue color, the pigment should be selected from copper phthalocyanine blue, indanthrene blue and the like. In the case of green color, the pigment should be selected from magnesium phthalocyanine, Co—Mn composite oxide and the like. These pigments are prepared in separate containers to obtain four colored liquids 9.

Each of the colored liquids 9 comprises a liquid mixture including isoparaffin, titanium oxide, silicon oxide, alumina and a coloring pigment, and the liquid mixture desirably has a viscosity in the range of 200 to 800 cP at 25° C.

When the viscosity of the colored liquid 9 is smaller than 200 cP, it becomes difficult to conceal the color tone of the magnetic particles 4 at the time of erasure. When the viscosity of the liquid 9 exceeds 800 cP, the magnetic particles 4 are not magnetophoresed smoothly, and it becomes necessary to increase the magnetic flux densities of the magnetic pen 2 and of the erasure magnet 3. Further, the display on the surface 1a of the panel 1 has a reduced resolution.

The colored magnetic particles 4 are those obtained by coating a ferrite powder (spinel ferrite, magnetoplumbite ferrite) or a metal powder (Fe, Ni, Cu, Co, etc.) with a coloring agent such as a resin, a pigment, a dye or the like. The magnetic particles 4 of each of the colors are obtained by blowing the coloring agent onto the magnetic powder selected as a core from the above. The particles are further classified to obtain ones within a product range. The particles preferably have an average particle diameter of 50 to 200 $\mu$m and, more preferably, 75 to 150 $\mu$m.

In the case of red color, the pigment is selected from quinacridone, anthraquinone dye, diazo dye and the like. In the case of black color, the pigment is selected from carbon black, nigrosine dye and the like. In the case of blue color, the pigment is selected from copper phthalocyanine blue, indanthrene blue and the like. In the case of white color, titanium white is used.

The colored magnetic particles 4 must be magnetized to be magnetophoresed in a low magnetic field such as the effective magnetic flux density of the magnetic recording pen 2 or erasure magnet 3. It is desired that the colored magnetic particles 4 are magnetized to be 8.0 emu/g or more in the applied magnetic field of 200 Oe and be magnetized to be 20.0 emu/g or more in the applied magnetic field of 500 Oe. In this case, the colored magnetic particles 4 are magnetophoresed to a sufficient degree, and the display and erasure can be excellently performed on the surface 1a of the panel 1.

When the magnetization of the colored magnetic particles 4 is smaller than the above range in the applied magnetic field, that is, the colored magnetic particles 4 are magnetized to a low degree, the colored magnetic particles 4 fail to be magnetophoresed to a sufficient degree in a range of the thickness t of the magnetic panel 1, and the display and erasure performance is deteriorated on the surface 1a of the panel 1.

It is desired that the liquid dispersions each contain 80 to 90 wt % of the colored liquid 9 and 10 to 20 wt % of the colored magnetic particles 4.

When the amount of the colored magnetic particles 4 is smaller than 10 wt %, the display on the surface 1a of the panel 1 has a low resolution. For example, the thickness of the lines and characters becomes thin and the lines are often broken. When the amount of the colored magnetic particles 4 exceeds 20 wt %, the concentration of the display on the surface 1a of the panel 1 can be increased, but the colored liquid 9 tends to be contaminated, and the color tone of the surface 1a of the panel 1 is deteriorated at the time of erasure.

As described above, the surface 1a of the magnetic panel 1 is divided into three regions having different colors. The different color tone is controlled for every region in a manner as described below. That is, there are prepared three kinds of colored liquids 9, colored magnetic particles 4, as well as three kinds of mask sheets 10, 11 and 12 as shown in FIG. 4. The mask sheets 10, 11 and 12 have openings 13 for first coloring, openings 14 for second coloring, and openings 15 for third coloring formed therein, respectively. These openings 13, 14 and have been so patterned as not to be overlapped with each other.

The same magnetic panel 1 as the one shown in FIG. 1 is placed upside down while the upper substrate 8 is removed, and the mask sheet 10 having the openings 13 is placed thereon in position. Next, spaces of a plurality of cells 6, which are sectionalized to be located in a pattern corresponding to the openings 13 of the mask sheet 10, are filled with the first colored liquid 9a containing colored magnetic particles 4.

The mask sheet 10 is then removed, and the mask sheet 11 having the openings 14 of another pattern is placed in position in the same manner. Spaces of a plurality of cells 6, which are sectionalized to be located in a pattern corresponding to the openings 14 of the mask sheet 11, are filled with the second colored liquid 9b containing colored magnetic particles 4.

Next, the mask sheet 11 is removed, and the mask sheet 12 having the openings 15 of a further pattern is placed in position in the same manner. Spaces of a plurality of cells 6, which are sectionalized to be located in a pattern corresponding to the openings 15 of the mask sheet 12, are filled with the third colored liquid 9c containing colored magnetic particles 4.

Thereafter, the mask sheet 12 is removed, and the multi-cell structure 5 is sealedly covered with the substrate 8.

Figure 3:
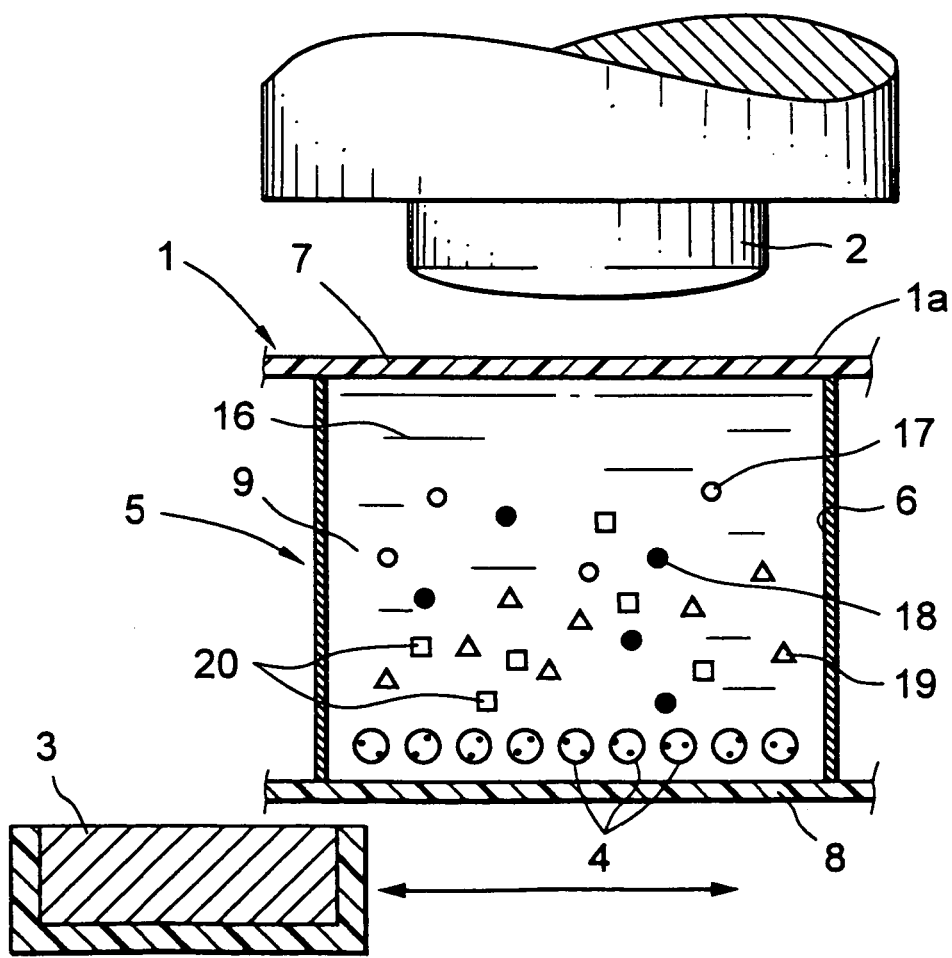
FIG. 3 is a sectional view illustrating, on an enlarged scale, the inside of one of cells constituting the magnetophoretic display panel.

According to these procedures, there is obtained a magnetophoretic display panel having a display surface of three different colors. As shown in FIG. 3, therefore, each cell 6 is filled with the colored liquid 9 which is a mixture of isoparaffin 16, titanium oxide 17, silicon oxide 18, alumina 19 and a pigment 20. To obtain the surface 1a of the magnetic panel 1 in four colors, the cells of the multi-cell structure may be filled with four kinds of colored liquids using four kinds of mask sheets. This makes it possible to obtain magnetophoretic display panels of various color tones.

The foregoing embodiment has dealt with the case where the display surface has a plurality of colors and the magnetic particles have a single color. However, the magnetic particles may have a plurality of colors put thereon. Instead of the colored liquid and the colored magnetic particles in the cells, a black-and-white display panel may be constituted like the prior art by using, for example, a white liquid and black magnetic particles, or by using a black liquid and white magnetic particles.

Further, the member for dividing the interior of the magnetic panel 1 into a plurality of cells is not limited to a honeycomb structure. There can be used microcapsules and other partitioning members.

EXAMPLE

The invention will be described in further detail by way of a concrete example.

Preparation of Liquid Dispersions to be Encapsulated in a Panel

Colored liquids 1 to 5 were obtained by measuring out isoparaffin, titanium oxide, silicon oxide, alumina and pigments of various colors in predetermined amounts in accordance with the compositions as shown in Table 1 below, followed by stirring using a homogenizer at 4000 rpm for 5 minutes. The liquids were transferred into separate containers, and to them predetermined amounts of colored magnetic particles 1 to 3 of various color tones shown in Table 2 were added. The mixtures were stirred using a stirrer at 300 rpm for one minute to obtain liquid dispersions to be encapsulated in the panel.

TABLE 1

| Colored liquid sample | Color tone of liquid | Composition (wt %) | | | | | Viscosity at 25° C. (cP) |
|---|---|---|---|---|---|---|---|
| | | Isoparaffin | Alumina | Silicon oxide | Titanium oxide | Colorant | |
| Colored liquid 1 | Red | 96.5 | 0.5 | 0.5 | 0.5 | 2.0 (I.C.I. PIGMENT RED 12) | 280 |
| Colored liquid 2 | Blue | 94.0 | 0.5 | 2.0 | 1.0 | 2.5 (I.C.I. PIGMENT BLUE 15) | 750 |
| Colored liquid 3 | Yellow | 95.5 | 0.5 | 1.0 | 0.5 | 2.5 (I.C.I. SOLVENT YELLOW 16) | 550 |
| Colored liquid 4* | White | 98.0 | 0.5 | 0.5 | 1.0 | — | 185 |
| Colored liquid 5* | Blue | 90.0 | 0.5 | 3.0 | 3.0 | 3.5 (I.C.I. PIGMENT BLUE 15) | 1500 |

Colored liquids marked with * (asterisk) lie outside the preferred range.
Materials used are as follows (available under tradenames and from manufacturers):
Isoparaffin: ISOPER-M(J) manufactured by EXXON CHEMICAL JAPAN LTD.
Alumina: ALUMINA C manufactured by Nippon Aerosil Co., Ltd.
Silicon oxide: RX-200 manufactured by Nippon Aerosil Co., Ltd.
Titanium oxide: TIPAQUE CR-50 manufactured by ISHIHARA SANGYO KAISHA, LTD.
Pigment: manufactured by IMPERIAL CHEMICAL INDUSTRIES.

TABLE 2

| Magnetic particle sample | Color tone of colored magnetic particle | Composition (wt %) | | | Average particle diameter of colored magnetic particles ($\mu$m) | Magnetization (emu/g) | |
|---|---|---|---|---|---|---|---|
| | | Magnetic particle | Resin | Pigment | | Magnetic field of 200 Oe applied | Magnetic field of 500 Oe applied |
| Colored magnetic particle 1 | White | Magnetic particle 1 75.0 | Acrylic resin 20.0 | Titanium white 5.0 | 100 | 10.1 | 23.2 |

TABLE 2-continued

| Magnetic particle sample | Color tone of colored magnetic particle | Composition (wt %) | | | Average particle diameter of colored magnetic particles (μm) | Magnetization (emu/g) | |
| --- | --- | --- | --- | --- | --- | --- | --- |
| | | Magnetic particle | Resin | Pigment | | Magnetic field of 200 Oe applied | Magnetic field of 500 Oe applied |
| Colored magnetic particle 2 | Green | Magnetic particle 2 75.0 | Acrylic resin 20.0 | Co—Mn Composite oxide powder 5.0 | 120 | 9.3 | 21.8 |
| Colored magnetic particle 3* | Green | Magnetic particle 3 67.0 | Acrylic resin 28.0 | Co—Mn Composite oxide powder 5.0 | 100 | 7.7 | 19.1 |

Colored magnetic particle marked with * (asterisk) lies outside the preferred range.
Materials used are as follows (available under tradenames and from manufacturers):
Magnetic particle 1: magnetite containing 20 mol % of ZnO ($Zn_{0.33}Fe_{2.67}O_4$) manufactured by TDK Corporation
Magnetic particle 2: stainless steel (SUS410) manufactured by Daido Steel Co., Ltd.
Magnetic particle 3: magnetite ($Fe_3O_4$) manufactured by TDK Corporation
Acrylic resin: manufactured by Mitsui Chemicals, Inc.
Titanium white: manufactured by Titan Kogyo Kabushiki Kaisha
Co—Mn composite oxide powder: manufactured by Dainichiseika Color & Chemicals Mfg. Co.

Preparation of Magnetic Panel

The obtained liquid dispersions were charged, while being stirred, into a transparent panel including a multi-cell structure made of PET and having a predetermined thickness. Then, a PET sheet coated with an epoxy adhesive was stuck to the panel under pressure to completely seal it, to thereby obtain magnetic panels 1 to 8 shown in Table 3. The obtained magnetic panels were measured and evaluated in a manner as described below.

The measurements were taken in a manner as described below.

Measurement a. The magnetization of the colored magnetic particles was measured by using a vibration sample-type magnetometer (model VSM-3, manufactured by TOEI INDUSTRY CO., LTD.) while setting the sample of the colored magnetic particles to a holder and varying the magnetic field that was applied.

b. The effective magnetic flux density of a magnet was measured at the bottom of the panel having a predetermined thickness for the magnetic field applied from the upper surface of the panel, by using a handy-type magnetometer (model FS-5 manufactured by ADS CO., LTD.). At the time of the erasure, the values were measured by reversing the application of the magnetic field.

c. The color tone of display and erasure on the surface of the panel was confirmed by visual check.

d. The resolution of the display was confirmed visually. Breakages of lines and blurring of characters were observed.

TABLE 3

| Panel sample | Combination of colored liquid and colored magnetic particles | | | | Panel thickness (mm) | Effective magnetic flux density of magnetic pen at panel bottom (Gauss) | Effective magnetic flux density of erasure magnet at panel surface (Gauss) | Color tone of liquid on panel surface | Color tone of magnetic particle during display | Resolution of display and display/erasure responsibility |
| --- | --- | --- | --- | --- | --- | --- | --- | --- | --- | --- |
| Panel 1 | Colored liquid sample | 1 | 2 | 3 | 1.0 | 370 | 850 | Good | Good | Good |
| | Colored magnetic particle sample | 1 | 1 | 1 | | | | | | |
| Panel 2 | Colored liquid sample | 1 | 2 | 3 | 0.8 | 475 | 1250 | Good | Good | Good |
| | Colored magnetic particle sample | 1 | 1 | 1 | | | | | | |
| Panel 3 | Colored liquid sample | 1 | 2 | 3 | 1.4 | 235 | 410 | Good | Good | Good |
| | Colored magnetic particle sample | 1 | 1 | 1 | | | | | | |
| Panel 4 | Colored liquid sample | 1 | 3 | — | 1.0 | 410 | 940 | Good | Good | Good |
| | Colored magnetic particle sample | 2 | 2 | — | | | | | | |
| Panel 5 | Colored liquid sample | 1 | 2 | 3 | 1.0 | 360 | 825 | Good | Good | Good |
| | Colored magnetic particle sample | 2 | 1 | 1 | | | | | | |
| Panel 6* | Colored liquid sample | 1 | 2 | 3 | 1.7 | 85 | 200 | Good | Good | Poor |
| | Colored magnetic particle sample | 1 | 1 | 1 | | | | | | |
| Panel 7* | Colored liquid sample | 4 | 5 | — | 1.0 | 340 | 760 | Poor | Poor | Poor |
| | Colored magnetic particle sample | 2 | 1 | — | | | | | | |
| Panel 8* | Colored liquid sample | 1 | 3 | — | 1.0 | 405 | 980 | Good | Good | Poor |
| | Colored magnetic particle sample | 3 | 3 | — | | | | | | |

Panel samples marked with * (asterisk) lie outside the preferred range.

In each of panel samples 1 to 8, the liquid dispersions contained 84.2 wt % of the colored liquid and 15.8 wt % of the colored magnetic particles.

As will be understood from the above Tables, use of the magnetic panel, magnetic pen, erasure magnet, colored magnetic particles and colored liquids constituted according to the present invention, makes it possible to obtain a magnetophoretic display panel having various color tones and featuring excellent display performance.

According to the magnetophoretic display panel having a multi-cell structure of the present invention as described above, limitation is imposed on the thickness of the panel to limit the effective magnetic flux densities of the magnetic pen and of the erasure magnet, making it possible to display clear and distinct indicia such as characters and pictures on the surface of the panel and to erase them neatly.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A magnetophoretic display panel comprising:
   a magnetic panel including a pair of substrates at least one of which is transparent and a multi-cell structure which is sealedly arranged between said substrates and formed with an interior space of a thickness of 0.8 to 1.5 mm, said multi-cell structure including a number of cells each of which contains therein a colored liquid and colored magnetic particles having a color tone different from that of said colored liquid;
   a magnetic recording member provided on an end thereof with a magnet, which member is adapted to be slidably moved on a surface of said magnetic panel to form a display on said surface of said magnetic panel due to magnetophoresis of said magnetic particles in each of said cells; and
   a magnetic erasure member arranged at a bottom of said magnetic panel so as to be moved along said bottom of said magnetic panel, to thereby erase the display on said surface of said magnetic panel due to magnetophoresis of said magnetic particles in each of said cells;
   said magnetic recording member exhibiting an effective magnetic flux density of 100 to 500 Gauss at said bottom of said magnetic panel when said magnetic recording member is positioned on said surface of said magnetic panel;
   said magnetic erasure member exhibiting an effective magnetic flux density of 300 to 1500 Gauss at said surface of said magnetic panel when said magnetic erasure member is positioned on said bottom of said magnetic panel.

2. A magnetophoretic display panel as defined in claim 1, wherein a number of said cells of said magnetic panel are classified into a plurality of regions by patterning, and the cells of each region contain the respective colored liquid and the respective colored magnetic particles having a color tone different from that of said respective colored liquid.

3. A magnetophoretic display panel as defined in claim 2, wherein said colored magnetic particles exhibit a magnetization of 8.0 emu/g or more when a magnetic field of 200 Oe is applied to said colored magnetic particles and exhibit a magnetization of 20.0 emu/g or more when a magnetic field of 500 Oe is applied to said colored magnetic particles; and
   each of said cells of said magnetic panel contains 80 to 90 wt % of said colored liquid and 10 to 20 wt % of said colored magnetic particles having a color tone different from that of said colored liquid.

4. A magnetophoretic display panel as defined in claim 3, wherein each of said colored liquids comprises a liquid mixture including isoparaffin, titanium oxide, silicon oxide, alumina and a coloring pigment, the liquid mixture having a viscosity of 200 to 800 cP at 25° C.

5. A magnetophoretic display panel as defined in claim 2, wherein each of said colored liquids comprises a liquid mixture including isoparaffin, titanium oxide, silicon oxide, alumina and a coloring pigment, the liquid mixture having a viscosity of 200 to 800 cP at 25° C.

6. A magnetophoretic display panel as defined in claim 1, wherein said colored magnetic particles exhibit a magnetization of 8.0 emu/g or more when a magnetic field of 200 Oe is applied to said colored magnetic particles and exhibit a magnetization of 20.0 emu/g or more when a magnetic field of 500 Oe is applied to said colored magnetic particles; and
   each of said cells of said magnetic panel contains 80 to 90 wt % of said colored liquid and 10 to 20 wt % of said colored magnetic particles having a color tone different from that of said colored liquid.

7. A magnetophoretic display panel as defined in claim 3, wherein each of said colored liquids comprises a liquid mixture including isoparaffin, titanium oxide, silicon oxide, alumina and a coloring pigment, the liquid mixture having a viscosity of 200 to 800 cP at 25° C.

8. A magnetophoretic display panel as defined in claim 1, wherein each of said colored liquids comprises a liquid mixture including isoparaffin, titanium oxide, silicon oxide, alumina and a coloring pigment, the liquid mixture having a viscosity of 200 to 800 cP at 25° C.

9. A magnetophoretic display panel as defined in claim 1 wherein said colored magnetic particles exhibit a magnetization of 8.0 emu/g or more when a magnetic field of 200 Oe is applied to said colored magnetic particles and exhibit a magnetization of 20.0 emu/g or more when a magnetic field of 500 Oe is applied to said colored magnetic particles,
   each of said dispersions contains 80 to 90 wt % of the respective colored liquid and 10 to 20 wt % of the respective colored magnetic particles having a color tone different from that of said respective colored liquid and the colored liquid has a viscosity within a range of 200 to 800 cP at 25° C.

10. A magnetophoretic display panel as defined in claim 9 wherein the colored magnetic particles include a magnetic material with an average particle diameter of 100 μm.

11. A magnetophoretic display panel as defined in claim 9 wherein the colored liquid includes 90% by weight of isoparaffin.

12. A magnetophoretic display device comprising:
   a transparent front substrate;
   a bottom substrate;
   a multi-cell structure sealedly interposed between said front and bottom substrates, said multi-cell structure having a thickness of 0.8 to 1.5 mm and being formed with a number of cells;
   dispersions each including a colored liquid and magnetic particles of a magnetic material with an average particle diameter of 100 μm and which have a color tone different from that of said colored liquid and which are dispersed in said colored liquid, said dispersions being encapsulated in said cells of said multi-cell structure wherein said colored magnetic particles exhibit a magnetization of 8.0 emu/g or more when a magnetic field of 200 Oe is applied to said colored magnetic particles and exhibit a magnetization of 20.0 emu/g or more when a magnetic field of 500 Oe is applied to said colored magnetic particles and the colored liquid has a viscosity of 200 to 800 cP at 25° C.;

a magnetic recording member provided at an end thereof with a magnet adaptable to be brought into contact with a surface of said front substrate to form a display on said front substrate due to magnetophoresis of said magnetic particles in each of said cells; and a magnetic erasure member arranged on an outer surface of said bottom substrate so as to be moved along said outer surface of said bottom substrate, to thereby erase the display on said front substrate due to magnetophoresis of said magnetic particles in each of said cells;

said magnetic recording member exhibiting an effective magnetic flux density of 100 to 500 Gauss in the vicinity of said bottom substrate when said magnetic recording member is positioned on said surface of said front substrate;

said magnetic erasure member exhibiting an effective magnetic flux density of 300 to 1500 Gauss at said surface of said front substrate when said magnetic erasure member is positioned on said outer surface of said bottom substrate.

13. A magnetophoretic display device as defined in claim 12, wherein a number of said cells are classified into a plurality of regions by patterning in such a manner that the cells in each region contain the respective dispersion including the colored liquid which has the color tone different from that of the colored liquid which is included in the liquid dispersion contained in the cells of the adjacent region.

14. A magnetophoretic display device as defined in claim 13, wherein each of said dispersions contains 80 to 90 wt % of the respective colored liquid and 10 to 20 wt % of the respective colored magnetic particles having a color tone different from that of said respective colored liquid.

15. A magnetophoretic display device as defined in claim 14, wherein each of said colored liquids includes isoparaffin, titanium oxide, silicon oxide, alumina and a coloring pigment.

16. A magnetophoretic display device as defined in claim 13, wherein each of said colored liquids includes isoparaffin, titanium oxide, silicon oxide, alumina and a coloring pigment.

17. A magnetophoretic display device as defined in claim 12, wherein each of said dispersions contains 80 to 90 wt % of the respective colored liquid and 10 to 20 wt % of the respective colored magnetic particles having a color tone different from that of said respective colored liquid.

18. A magnetophoretic display device as defined in claim 17, wherein each of said colored liquids includes isoparaffin, titanium oxide, silicon oxide, alumina and a coloring pigment.

19. A magnetophoretic display device as defined in claim 12, wherein each of said colored liquids includes isoparaffin, titanium oxide, silicon oxide, alumina and a coloring pigment.

20. A magnetophoretic display device as defined in claim 12 wherein the colored liquid includes 90% by weight of isoparaffin.

* * * * *